United States Patent [19]

Canter et al.

[11] Patent Number: 5,594,324
[45] Date of Patent: Jan. 14, 1997

[54] STABILIZED POWER CONVERTER HAVING QUANTIZED DUTY CYCLE

[75] Inventors: Stanley Canter, Phoenix, Ariz.; Ronald Lenk, Sunnyvale, Calif.

[73] Assignee: Space Systems/Loral, Inc., Palo Alto, Calif.

[21] Appl. No.: 414,527

[22] Filed: Mar. 31, 1995

[51] Int. Cl.$^6$ .................................................. G05F 1/575
[52] U.S. Cl. .............................. 323/282; 323/351; 363/41
[58] Field of Search ....................................... 323/282, 351; 363/41

[56] References Cited

U.S. PATENT DOCUMENTS

| | | | |
|---|---|---|---|
| 3,733,540 | 5/1973 | Hawkins | 323/282 |
| 4,439,821 | 3/1984 | Grippe | 363/26 |
| 4,630,187 | 12/1986 | Henze | 363/41 |
| 4,725,940 | 2/1988 | Henze | 363/72 |
| 5,233,287 | 8/1993 | Lenk | 323/268 |
| 5,272,614 | 12/1993 | Brunk et al. | 363/21 |
| 5,359,280 | 10/1994 | Canter et al. | 323/282 |
| 5,436,820 | 7/1995 | Furmanczyk | 363/41 |
| 5,453,921 | 9/1995 | Shutts | 363/41 |
| 5,477,132 | 12/1995 | Canter et al. | 323/282 |

*Primary Examiner*—Jeffrey L. Sterrett
*Attorney, Agent, or Firm*—Perman & Green

[57] ABSTRACT

A multi-slice power converter (10) employs a digital circuit (22) to generate phase-delayed pulse width modulated (PWM) signals, which results in the duty cycle of the PWM signals having only a certain number of possible values. The quantization of the duty cycle is shown to result in two types of instabilities which are unique to power converters having a digital control loop, in addition to the conventional analog-type of instabilities. This invention provides novel methods and apparatus for stabilizing the digital control loop of the power converter through the use of a periodic dither signal having a frequency that is less than the PWM frequency and greater than a bandwidth frequency of the converter. The dither signal functions to effectively increase the number of possible duty cycles by a factor given by the ratio of the dither frequency to the bandwidth frequency.

10 Claims, 6 Drawing Sheets

SAMPLE 50ns

STABILIZED POWER CONVERTER HAVING QUANTIZED DUTY CYCLE

FIELD OF THE INVENTION

This invention relates generally to power converters and, in particular, to DC to DC power converters having a digital control loop that generates a quantized duty cycle.

BACKGROUND OF THE INVENTION

The operation of a DC to DC power converter having an explicitly digital control system presents a number of problems that are not encountered in conventional power converters having analog control loops. Although it is known that the use of a current mode inner control loop for a power supply is equivalent to a sampling system having a delay, with a resulting infinite number of zeroes, these effects only matter at frequencies that are approximately equal to one half of the switching frequency, i.e., at frequencies substantially above the bandwidth. Quantization of the converter pulsewidth, on the other hand, is important at all frequencies, and thus cannot be accurately modelled with an analog approximation.

Pulsewidth quantization results in unconventional converter behavior. For example, if a disturbance is introduced into the analog portion of the closed control loop, and if that disturbance is sufficiently small that it does not cause the duty cycle of the pulse width modulator (PWM) to increase by a sufficient amount, then the duty cycle generated by the digital controller will be unaffected. That is, sufficiently small disturbances can be shown to have zero gain (−∞dB).

A further example of unconventional behavior can be conceptualized as follows, for the case where the disturbance has an amplitude that is sufficient to perturb the control loop. Assume that an analog sinusoidal disturbance is introduced into the control loop, and then further assume that the disturbance has sufficient amplitude so that once every cycle it causes the duty cycle to increase from a first quantized step to a next, second quantized step, and then to decrease back to the first quantized step for the rest of the cycle. Since the output voltage is given by the product of the input voltage times the duty cycle, a quantized step in the output voltage will also occur once every cycle. The control loop will attempt to correct this variation in output voltage. However, the control loop cannot perform this correction at a rate faster than its bandwidth. Thus, if the disturbance frequency is greater than the closed loop bandwidth, the entire system will oscillate at that bandwidth, attempting to correct the disturbance. This type of oscillation, which is due solely to the duty cycle quantization inherent in the digital control loop, is referred to herein as a digital oscillation.

Digital oscillations can also occur if an output voltage magnitude, which is a function of the reference voltage and the input voltage (for a buck converter), is not exactly equal to one of the possible duty cycles. In this case the system will detect that the voltage is, for example, too low, and will increase the duty cycle to the next quantized step. The system will then detect that the voltage is too high, and will decrease the duty cycle back to the original step. These corrections occur cyclically at the bandwidth frequency, and thus also results in a digital oscillation.

On the other hand, as the disturbances grow sufficiently large, it is clear that the quantization of the duty cycle becomes unnoticeable, and the system is well approximated by a continuous duty cycle and conventional analog behavior, i.e., the converter system exhibits a phase and gain margin.

In summary, there are two types of stability that need to be addressed when implementing a power converter having a digital control loop, in addition to the conventional analog-type of stability. The two types of stability concerns relate to: (a) digital oscillations due to noise injection; and (b) oscillations due to a mismatch between the output voltage setpoint and the available (quantized) duty cycles. The first type of stability concern is independent of the power supply's operating point; while the second type depends on the input and output voltages, as well as on the number of possible duty cycles.

Reference may be had to U.S. Pat. Nos. 4,630,187 and 4,725,940 by C. P. Henze for teaching quantized duty ratio power converters, and to U.S. Pat. No. 5,272,614 by Brunk et al. for teaching a microprocessor-controlled DC-DC converter that outputs a switch control signal that has both coarse and fine quantization.

SUMMARY OF THE INVENTION

The foregoing and other problems are overcome by a method and circuit for stabilizing a power converter against oscillations due to a mismatch between an output voltage setpoint and available ones of a plurality of quantized duty cycles. The method includes the steps of (a) generating a reference voltage for indicating a desired output voltage setpoint: (b) comparing the reference voltage to an actual output voltage of the power converter to derive an error signal; (c) varying the pulsewidth of a first pulsewidth modulated control signal in accordance with the error voltage, the first pulsewidth modulated control signal having a first frequency; and (d) converting the first pulsewidth modulated control signal to at least one second pulsewidth modulated control signal for varying a conduction time of a converter switching means so as to make the actual output voltage conform to the desired output voltage. The step of converting includes a step of quantizing the pulsewidth to one of a plurality of quantized duty cycles. The method further includes a step of injecting a dither signal into the closed control loop such that the dither signal appears in the error signal. The dither signal has a second frequency that is less than the first frequency and greater than a bandwidth frequency of the power converter. The dither signal functions to effectively increase the number of possible duty cycles by a factor given by the ratio of the second frequency to the bandwidth frequency. In an illustrated embodiment of the invention the dither signal frequency is one quarter of the first frequency and at least an order of magnitude greater than the bandwidth frequency.

Also described is a satellite communications payload that includes the power converter of this invention, wherein the power converter generates operating power for a downlink RF power amplifier.

BRIEF DESCRIPTION OF THE DRAWINGS

The above set forth and other features of the invention are made more apparent in the ensuing Detailed Description of the Invention when read in conjunction with the attached Drawings, wherein:

FIG. 1B is a block diagram of the FPGA circuit of FIG. 1A, wherein FIGS. 1A and 1B are hereinafter referred to collectively as FIG. 1;

DETAILED DESCRIPTION OF THE INVENTION

Figure 1A:
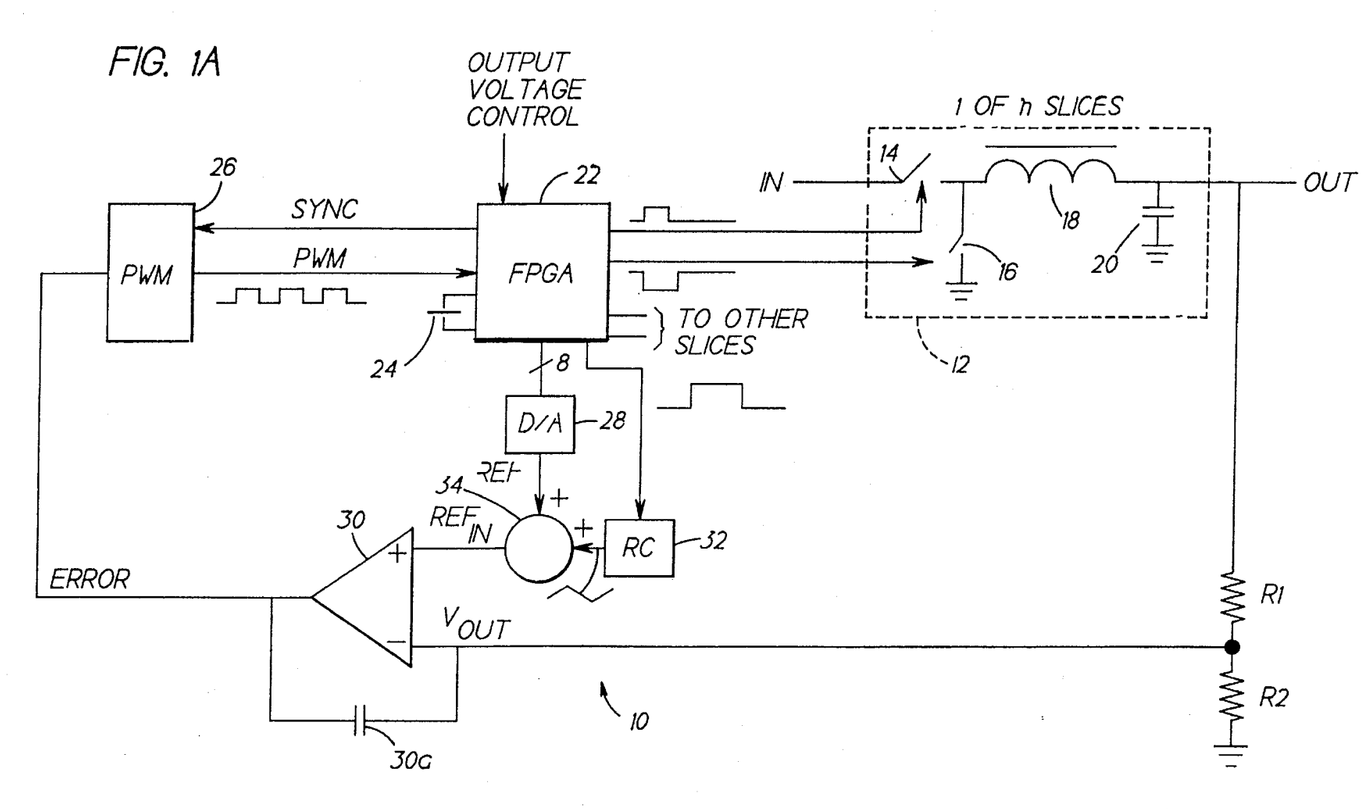
FIG. 1A is a block diagram of a multi-slice power converter having a digital control loop.
Figure 1B:
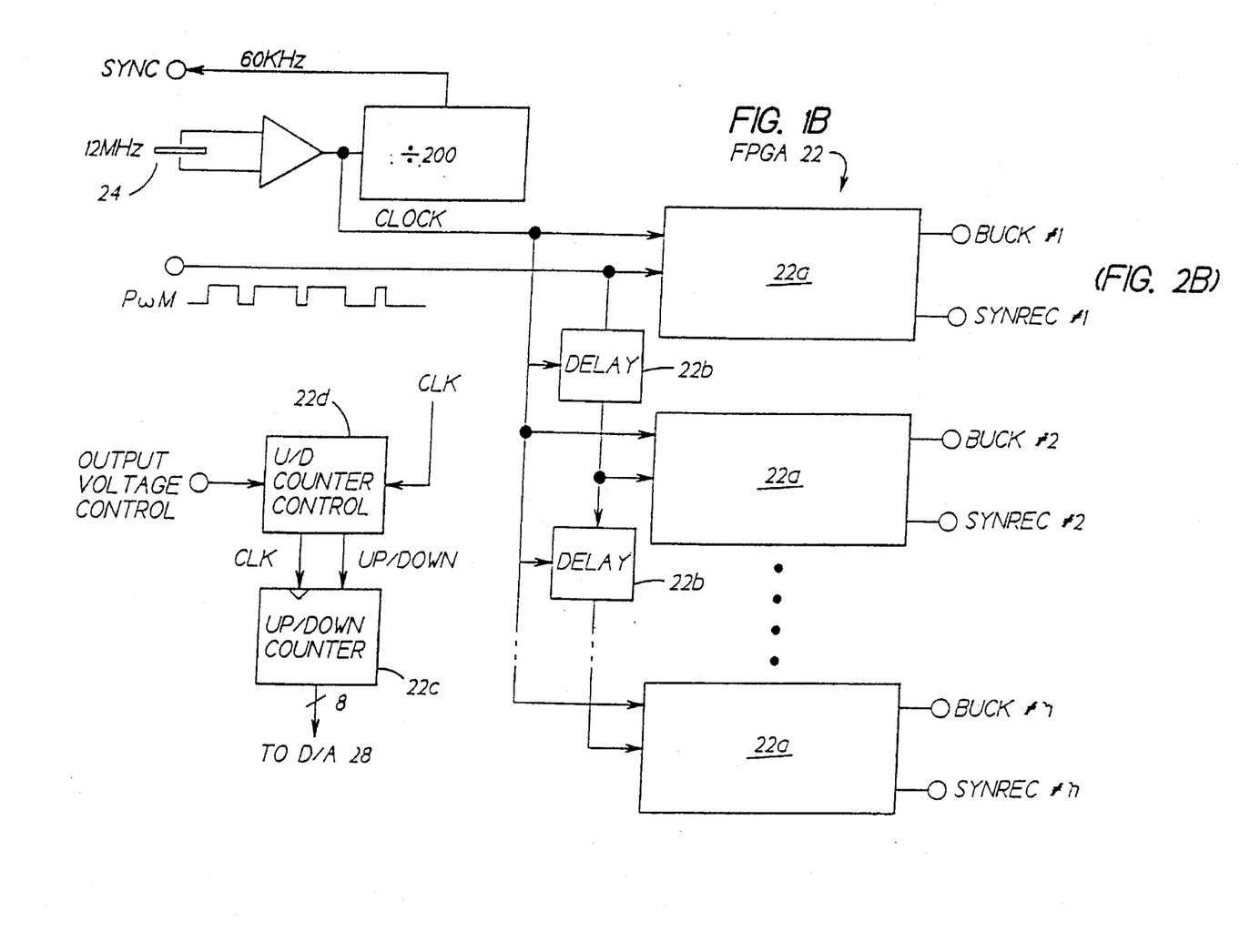

Referring now to FIG. 1 there is shown a DC-DC power converter 10 that is constructed and operated in accordance with this invention. The fundamental topology of the converter 10 is non-isolated buck. In order to provide a high current output the converter 10 is preferably structured with n buck slices 12. In the presently preferred embodiment five buck slices are used, although this number is not to be read as a limitation upon the practice of this invention. In general, n can be any integer that is equal to or greater than one. The use of five slices in the converter 10 enables fault-tolerance, since if one slice fails (e.g., blows its own fuse) the remaining four slices are sized so as to continue providing full power. Each slice 12 is constructed as a buck converter power stage having a buck MOSFET 14 (illustrated as a switch), and a second MOSFET 16 that functions as a synchronous rectifier. Each slice 12 includes gate drivers (not shown) for the MOSFET switches 14 and 16, an inductance 18, and a filter capacitor 20. To achieve high efficiency, the power stage does not use Schottky diode rectifiers, but instead uses the second MOSFET 16 as a synchronous rectifier. In order to prevent cross-conduction, a condition wherein both of the MOSFETs 14 and 16 are on simultaneously, thereby presenting a short to the input (In) bus, the buck transistor 14 turns on only after the synchronous rectifier transistor 16 has turned off, and turns off before the rectifier transistor 16 turns on. FIG. 2B illustrates the time relationship between the gate drive waveform for the buck MOSFET 14 and the rectifier MOSFET 16. These signals to control the buck transistor 14 and the rectifier transistor 16 are not merely inverses of each other, but must involve delays, and thus require two separate drive signals.

In order to reduce output ripple (which for this embodiment is preferably less than 50 mVpp at 166A to prevent injecting noise into the antenna load); the slices are phased 360°/5 =72° apart (see FIG. 2A), increasing the ripple frequency from a fundamental 60 kHz to 300 kHz. This increased frequency also reduces stress on the capacitors. Altogether, a total of 2×5=10 different control signals (one each for the MOSFET buck transistor 14 and the MOSFET synchronous rectifier 16 in each slice 12) are required to control the power stage.

Generation of the ten control signals using a conventional analog approach would be complicated. For example, the use of one-shots would require a moderately large number of integrated circuits, trimming resistors, low temperature coefficient capacitors, etc.

In the preferred embodiment of the invention a single digital integrated circuit is employed to synthesize the control signals. In the presently preferred embodiment of this invention the digital integrated circuit is embodied within a Field Programmable Gate Array (FPGA) 22. In other embodiments of the invention a plurality of discrete integrated circuits can be employed instead, and/or a suitably programmed high speed digital signal processor could be used to generate the control signals for the slices 12, as well as to perform the other functions that are described below. The use of the FPGA is preferred in that it enables a low cost and simple one chip digital control circuit to be implemented.

The FPGA 22 drives a 12 MHz crystal 24 (period=83.3 nsec) from two of its pins, and uses the resulting square wave as a clock signal. Dividing the 12 MHz clock signal by 200 (using a synchronous counter) generates the 60 kHz clock which is used to synchronize (SYNC) an external PWM integrated circuit 26.

Figure 2A:
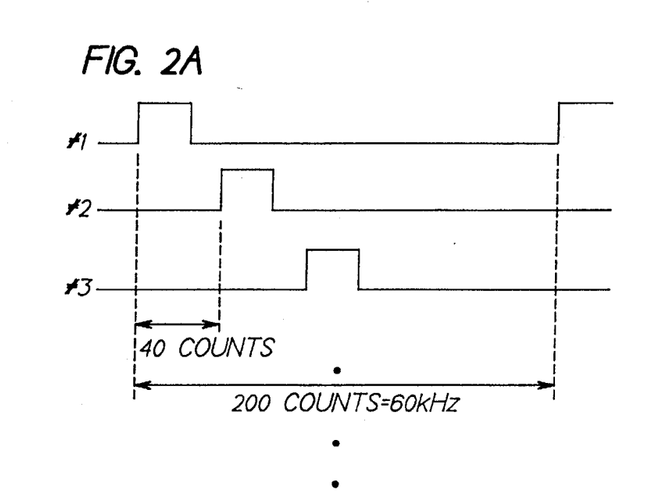
FIG. 2A is a timing diagram showing the slice phasing for the converter of FIG. 1.
Figure 2B:
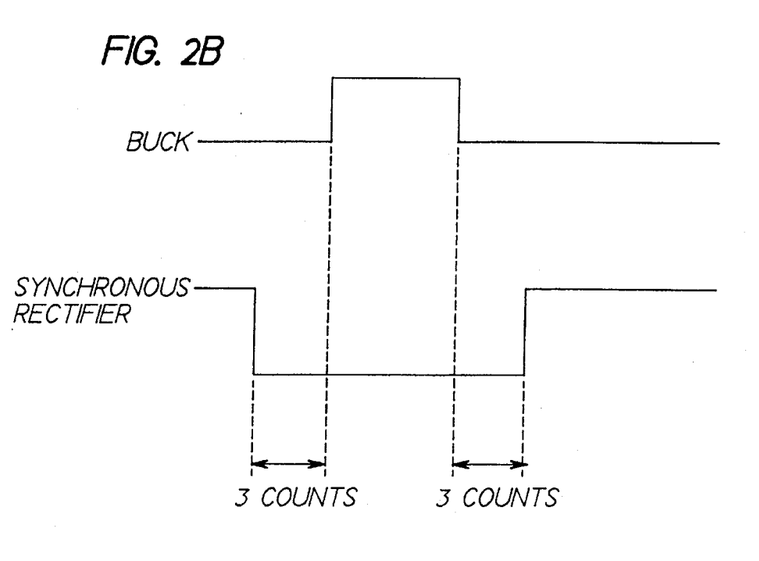
FIG. 2B is a timing diagram showing the signal timing for the buck switch and the synchronous rectifier for the converter of FIG. 1.

With the PWM signal output from the PWM 26 thus established at 60 kHz, generating the required phasing and delays for the power stage control signals becomes straight-forward: a first signal reflects exactly the input signal coming from the PWM 26, and subsequent slices 12, which are delayed 360°/5=12 MHz/(60 kHz×5)=200 counts/5=40 counts, are generated by FPGA counters 22a, and associated 40 count delay circuits 22b, that are triggered by the rising and falling edges of the first PWM signal (see FIG. 2A). Similarly, the absence of cross-conduction is guaranteed by forcing the buck transistor 14 and the rectifier transistor 16 of each slice 12 to be delayed on their respective edges by 250 nsec=3 clock counts (see FIG. 2B).

The FPGA 22 also includes an up/down counter 22c and associated counter control 22d used to program an external 8-bit D/A converter 28, which in turn generates a required reference voltage (REF) for the PWM 26 via an error amplifier 30. The error amplifier 30 also receives an input from a resistor divider comprised of R1 and R2 which are connected to the output node (OUT) that is coupled in common to the output of each of the n slices 12. The voltage that is developed at the junction of R1 and R2 ($V_{OUT}$) is input to the error amplifier 30, and a difference between this voltage and the reference voltage is input to the PWM 26 as an error voltage (ERROR) to close the control loop.

The use of the FPGA 22 causes the control loop to become irreducibly digital. That is, with the FPGA 22 in the power converter control loop only certain discrete pulsewidths are possible. For example, if the output of the PWM 26 is anywhere between 19.5/12 MHz=1.625 μsec and 20.5/12 MHz=1.875 μsec, the outputs of the FPGA 22, which generates the signals which actually control the power stage, are exactly 20/12 MHz=1.750 μsec. Thus, only certain discrete pulsewidths can be obtained, and the pulsewidth of the signals applied to the power stage (i.e., the slices 12) is quantized. By contrast, in a conventional analog system any desired pulsewidth can be generated as a continuous function.

The quantization of the power stage control signal pulsewidths leads to the stability concerns that were discussed previously. To reiterate, there are two types of stability concerns that arise as a result of the use of the digital control loop of FIG. 1, in addition to the conventional analog-type of stability. These stability concerns relate to: (a) digital oscillations due to noise injection; and (b) oscillations due to a mismatch between the output voltage setpoint and the available (quantized) duty cycles. As was previously stated, the first type of stability concern is independent of the power supply's operating point; while the second type depends on the input and output voltages, as well as on the number of possible duty cycles that are attainable by the PWM signal.

An analysis of these stability concerns is now presented so as to provide a greater appreciation and understanding of the benefits that accrue from the use of the teaching of this invention.

First to be considered analytically is the effect of moderate size disturbances, i.e., those that are large enough to cause a change in the duty cycle, but not large enough to make the above-mentioned analog approximation valid. In this portion of the analysis the gain and phase of a sinusoidal disturbance passing through the switching section of the converter will be considered.

Figure 3A:
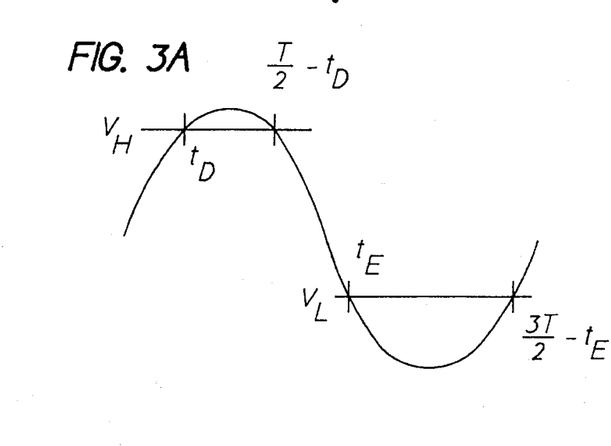
FIGS. 3A and 3B illustrate an exemplary input sinusoid disturbance and the resulting quantized output, respectively, and are useful in explaining the invention.
Figure 3B:
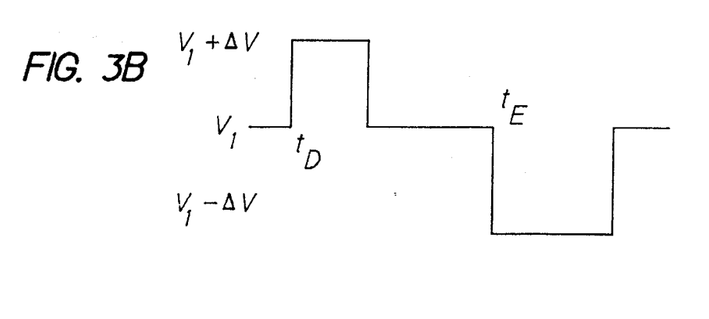

Referring to FIG. 3A, a sinusoid is of such amplitude and offset that it hits one duty cycle transition level at some point during its positive swing, and also hits a second duty cycle transition during its negative swing. It will become apparent below that this case is generic. The sinusoid need not be symmetric, that is, it may be above the high level longer than it is below the low level, or vice versa. The resulting output is shown in FIG. 3B. It should be noted the steps shown are not at the switching frequency: they are instead output voltage responses of the converter 10 to the sinusoidal disturbance. In fact, it may be useful to consider these steps as being the output of the DC transformer of a state-space averaged model. Each level is characterized by a phase angle of the sinusoid, or equivalently by a time at which it turns on and off. Clearly, there is a symmetry around $\pi/2$ and $3\pi/2$ radians for the high and the low levels, respectively.

The mathematical details of the foregoing are provided in the Appendix that precedes the claims. To summarize those results here, in order to determine the transfer function, the sine wave is injected and the result is determined. Of interest are only the components at the same frequency as the injected signal. That is, and just as for analog stability analyses, the higher frequency harmonics do not affect stability. Instead, they merely represent the nonlinearities of the system. If a Fourier representation of the output is formed, with just the input frequency retained, it is observed that there is no phase shift between the input disturbance and the quantized response.

Referring to the origin of the various terms in the Appendix equation (6), and how they cancel in equation (7), it is clear that the symmetry of the output piecewise constant waveform is the same as that of the input sinusoid. Thus, regardless of the number of levels crossed, the phase term will remain zero.

Looking next at the amplitude term, we find that the maximum gain (from the Appendix) is:

$$Gmax = 2\Delta V/\pi Va; \quad (13)$$

and the ratio of the digital to the analog gain is:

$$Gmax,digital/Gmax,analog = 2/\pi < 1. \quad (14)$$

This is the maximum possible gain for any number of steps; thus, the digital gain is always less than the gain of the approximating analog system, and, since the phase shift is zero, the digital system is always stable if the analog system is stable. This is an important realization, as will be evident below.

Although it has been demonstrated that the digital system's stability is determined by the analog system's stability, this realization does not bear directly on the problem that results from digital oscillations that are due to unachievable duty cycles, rather than loop disturbances. As was shown above, since the input voltage is a continuous variable, these oscillations would certainly exist, so it is necessary to provide circuitry to suppress these oscillations.

In accordance with an aspect of this invention the FPGA 22 of FIG. 1 includes circuitry (e.g., a divide by 4 counter) to generate a square wave at 15 kHz, i.e., one quarter of the 60 kHz switching frequency. This square wave is then filtered by an RC network 32 to form a triangle wave, and this triangle wave is added at node 34 to the DC reference voltage. The result is the generation of a small ripple component in the reference voltage ($REF_{in}$) for the PWM 26.

The ripple frequency is selected so as to be far higher than the bandwidth of the converter 10 (e.g., an order of magnitude higher). As a result, the error amplifier 30 cannot respond to the ripple component. As a result, some portion of each cycle of the 15 kHz ripple causes the duty cycle generated by the PWM 26 to have a first value, and the remainder of the ripple cycle causes the duty cycle generated by the PWM 26 to have a second value.

A slight adjustment of the gain of the error amplifier 30 (at a low frequency) produces a slight adjustment of the number of PWM pulses that are at the higher vs. the lower duty cycle. Thus, at the relatively low frequency of the converter bandwidth, an effectively continuous adjustment of the error amplifier 30 is possible, yielding a substantially continuous adjustment of the output voltage. This then eliminates a possibility of digital oscillation, since this dithering of the reference voltage with the 15 kHz signal produces, in effect, a subdivision of the possible duty cycles possible (by a factor of 15 kHz/bandwidth). The dither frequency component also does not appear to any significant degree in the output or the input of the converter 10, since its frequency is well beyond the input and output LC filter frequencies.

In accordance with this aspect of the invention it has been shown that the oscillation due to unachievable duty cycles is suppressed by adding in a predetermined amount of dither to the reference voltage to the PWM 26.

Figure 4:
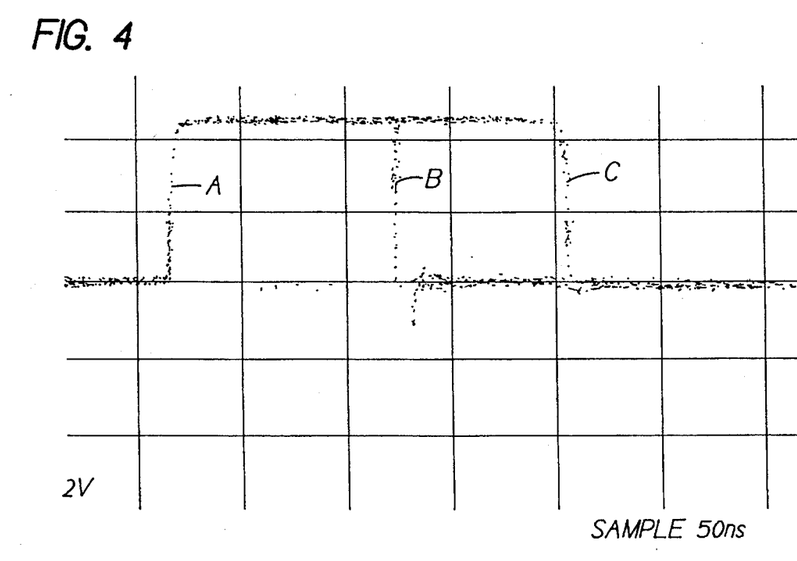
FIG. 4 illustrates a typical quantized pulse width modulated signal A that transitions between a first pulse width B and a second pulse width C.

A 1300 W breadboard using the FPGA 12 as described herein was constructed, stabilized and tested. FIG. 4 shows the output drive signal from the FPGA 12 that goes directly to the power stages. For the waveform shown in FIG. 4 the reference voltage was driven with a superimposed small ac voltage, forcing the duty cycle to continually adjust. In a conventional analog system, this would result in a continuous spectrum of duty cycles. However, for the digital control system only a discrete number of duty cycles are possible (here, two designated as B and C), with the two duty cycles being separated by (1/12 MHz)=83.3 nsec.

Figure 5:
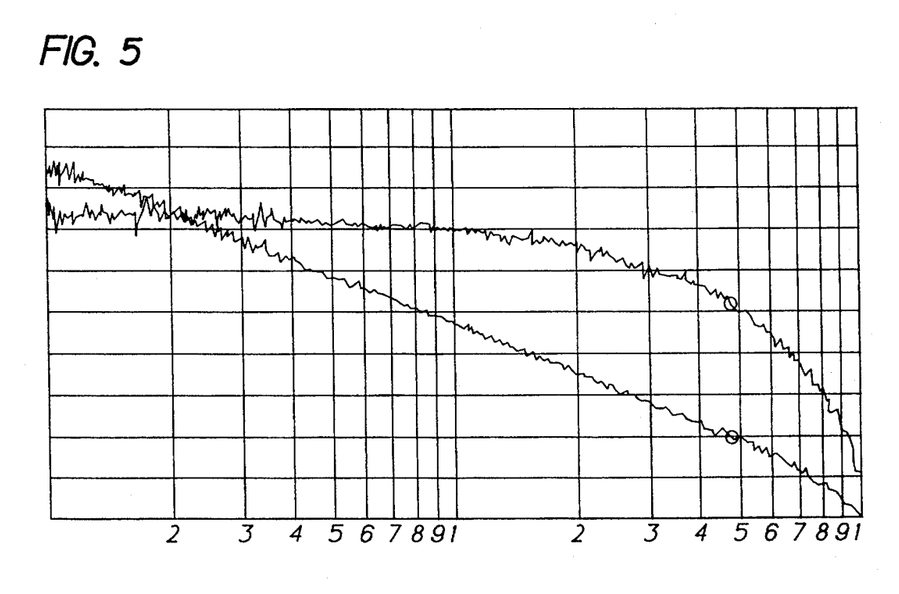
FIG. 5 illustrates a Bode plot for the voltage mode stabilized converter of FIG. 1.

FIG. 5 shows a Bode plot for the (voltage-mode) converter 10. Stabilization is shown to be successful, with 45° of phase margin at 500 Hz. The low bandwidth was selected for other, system reasons, and was not necessitated by the digital loop. The compensation (30a in FIG. 1) for the error amplifier 30 was comprised of a single pole at the origin.

Figure 6:
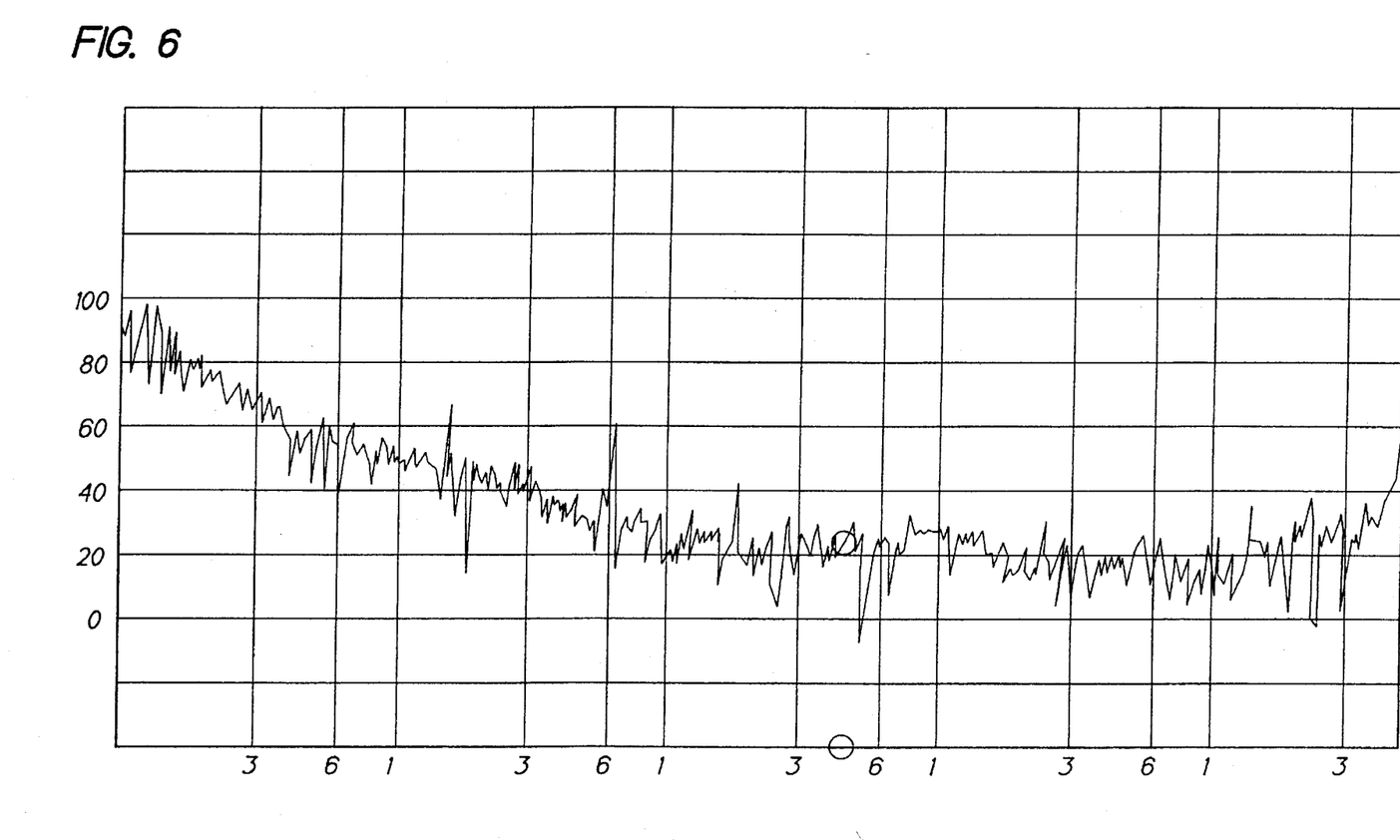
FIG. 6 illustrates the input noise spectrum for the converter of FIG. 1.

FIG. 6 illustrates the input noise spectrum of the converter 10. Only background noise is visible at 300 kHz, the overall switching frequency, indicating the correct phasing of the slices 12. Peaks of about 20 dB above background are visible at 60 kHz and its third harmonic 180 kHz. This is believed to be due to imbalances in the power distribution system, causing some slices to carry more power than others (the input current can be as high as 100A in the illustrated embodiment of the converter 10). Finally, a peak is visible at 15 kHz, the dithering frequency. Aside from increasing the size of the input filter, this peak can also be reduced by decreasing the amount of dither. However, this reduction would also reduce the margin for stability against unachievable duty cycle oscillations.

It has been shown that the use of the FPGA 22 to generate the drive signals to the power stage of the converter 10 results in the control loop becoming irreducibly digital. Because the duty cycle can only have one of a certain small group of values, two types of stability questions arise: (a) the stability of the control loop against signals that cause the duty cycle to cycle between two discrete values; and (b) the stability against oscillations caused by the control loop attempting to reach a duty cycle that is not a possible value. It has been shown above that the first type of oscillation will not occur if the control loop is stable as an analog system; and second, that the addition of a small amount of high-frequency dither to the reference voltage of the PWM 26 is sufficient to guarantee that the second type of oscillation is adequately controlled.

Figure 7:
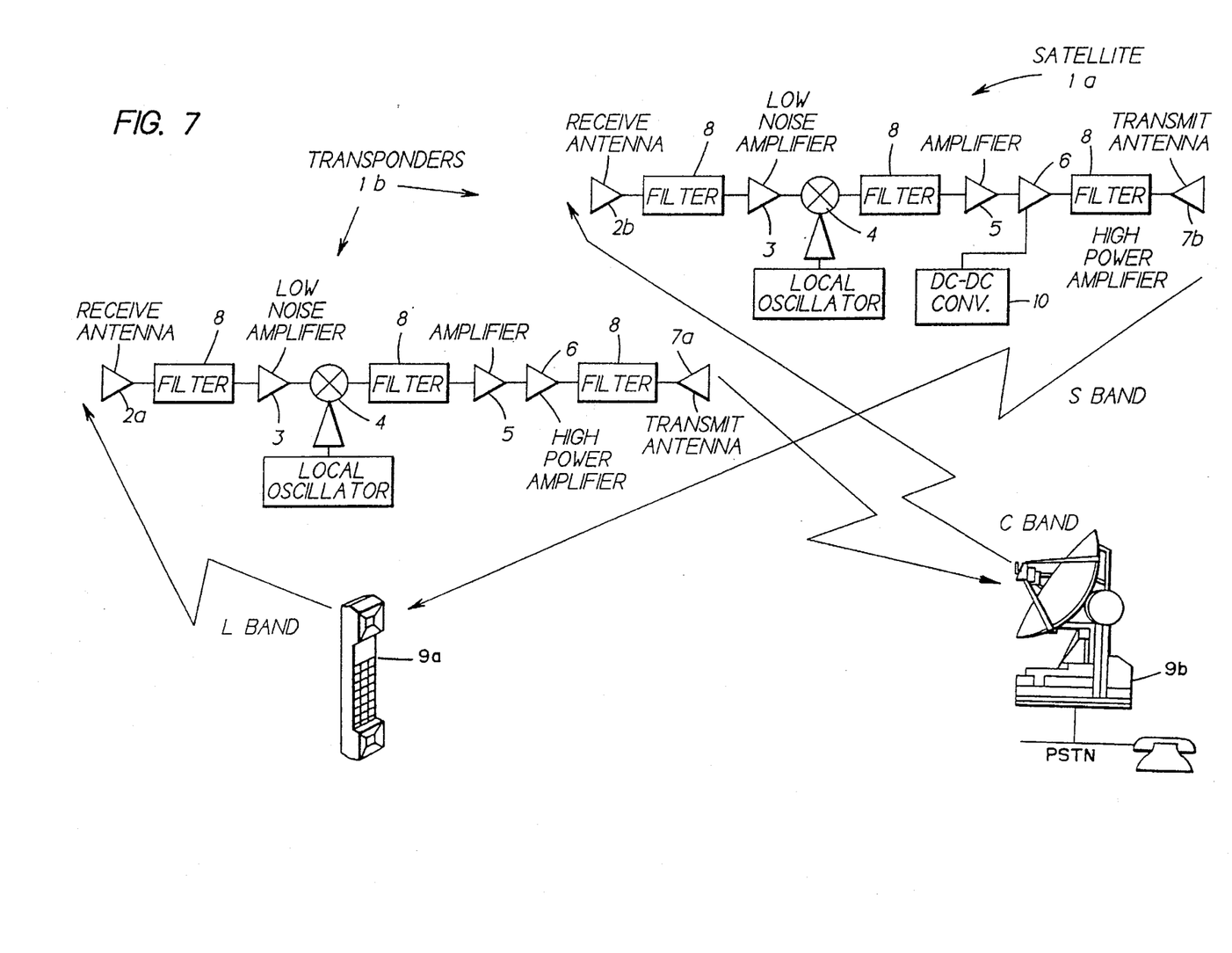
FIG. 7 illustrates a satellite communications payload of a type that benefits from the use of the stabilized converter of FIG. 1.

Having described in detail the presently preferred embodiment of this invention, reference is now made to FIG. 7 for illustrating a generic model for a payload of a communications satellite 1a of a type to which this invention can be applied. A constellation of 48 such satellites enables users to make phone calls anywhere in the world.

More particularly, FIG. 7 illustrates a satellite transponder 1b configured for full duplex communication. The communications payload includes one or more such transponders having a plurality of antennas 2 to receive signals from the earth's surface, low noise amplifiers 3, frequency shifters or converters 4 comprised of a local oscillator and a mixer, followed by amplifiers 5, high power amplifiers 6 and transmitting antennas 7. Filters 8 are also included to pass desired in-band signals and reject unwanted out-of-band noise signals. One transponder receives signals from user terminals 9a, frequency shifts the received user signals, and transmits the frequency shifted signals to a ground station, such as a gateway 9b that is connected to the public switched telephone network (PSTN). A second transponder receives signals from one or more of the gateways 9b, frequency shifts the received signals, and transmits the frequency shifted signals to the user terminals 9b. In this manner a full duplex communication path (voice and/or data) is established between user terminals and terminals connected to the PSTN.

By example, the user terminals 9a (fixed or mobile) are capable of operating in a full duplex mode and communicate via, by example, L-band RF links (uplink) and S-band RF links (downlink) through the return and forward satellite transponders, respectively. Uplink L-band RF links may operate within a frequency range of 1.61 GHz to 1.6265 GHz, bandwidth 16.5 MHz, and are preferably modulated with voice signals and/or digital signals in accordance with a spread spectrum technique. Downlink S-band RF links may operate within a frequency range of 2.4835 GHz to 2.5 GHz, bandwidth 16.5 MHz. The gateway 9b may communicate with the satellite 1a via receive antenna 2b and transmit antenna 7a with, by example, a full duplex C-band RF link that may operate within a range of frequencies centered on 5 GHz. The C-band RF links bi-directionally convey communication feeder links, and also convey satellite commands (forward link) and receive telemetry information (return link). The L-band and the S-band satellite antennas 2a and 7b, respectively, are multiple beam (preferably 16 beam) antennas that provide earth coverage within an associated service region. The L-band and S-band satellite antennas 2a and 7b are preferably congruent with one another. As an example, a total of approximately 3000 full duplex communications may occur through a given one of the satellites. Two or more satellites 1a may each convey the same communication between a given user terminal 9a and one of the gateways 9b by the use of spread spectrum techniques. This mode of operation thus provides for diversity combining at the respective receivers, leading to an increased resistance to fading and facilitating the implementation of a soft handoff procedure.

It is pointed out that all of the frequencies, bandwidths and the like that are described above are representative of but one particular system. Other frequencies and bands of frequencies may be used with no change in the principles being discussed. As but one example, the feeder links between the gateway 9b and the satellite 1a may use frequencies in a band other than the C-band, for example the Ku or Ka bands.

It can be appreciated that the S-Band transmitter 6 is the highest power element on the spacecraft. The S-Band transmitter is preferably powered by the DC-DC converter 10 as described in detail above.

The output power of the S-Band transmitter power amplifier 6 is determined by its supply voltage, and so to control the S-Band transmitter power, the power converter 10 has an adjustable output voltage that ranges from 2 V at 66A to 8.3 V at 166A. A signal (not shown in FIG. 1) is input to the FPGA 22 to control the magnitude of the digitally programmed REF voltage output from the D/A 28 and, thus, to control the output power of the converter 10 and the output power of the S-Band transmitter power amplifier 6.

With an input voltage range of 14–23 V (derived from on-board solar cells or batteries), high efficiency is required in order to make the satellite power budget practical. In addition, the converter 10 should be small, lightweight and fault-tolerant, since it is intended to operate in space.

The converter 10 of this invention provides the necessary controllable output power to the S-band transmitter amplifier 6, and does so employing the digital control loop implemented by the FPGA 12 and the stabilization techniques that were detailed above.

It should be realized that a number of modifications can be made to the presently preferred embodiment of this invention. By example, the dither signal generated by the FPGA 12 can instead be incorporated into the digital data that drives the D/A 28, thereby eliminating the requirement to provide the RC network 32 and the summing node 34. This embodiment assumes that the D/A 28 has sufficient resolution. Furthermore, the teaching of this invention applies as well to power converters that use fixed reference voltages, as opposed to the programmable (variable) reference voltage output by the D/A 28.

Further by example, other switching frequencies and other types of converter topologies can be employed.

Also by example, the synchronous rectifier 16 can be replaced by a conventional Schottky-type rectifier, thereby eliminating one of the required control signals per slice.

In general, the dither signal is a periodic signal having, by example, a sinusoidal or a triangular wave-shape. A minimum amplitude for the dither signal is one that covers at least two quantization steps, while a maximum amplitude is generally set by system noise requirements.

The dither signal has a frequency that is less than the PWM frequency and greater than a bandwidth frequency of the converter. The dither signal functions to effectively increase the number of possible duty cycles by a factor given by the ratio of the dither frequency to the bandwidth frequency. In the embodiment of the invention that was described in detail above the dither signal frequency is one quarter of the PWM frequency and at least an order of magnitude greater than the bandwidth frequency.

While the invention has been particularly shown and described with respect to a preferred embodiment thereof, it will be understood by those skilled in the art that changes in form and details may be made therein without departing from the scope and spirit of the invention.

APPENDIX

In the following a sine wave is injected and the output of the quantization process is observed at the same frequency. In equations, then, the sine is $$V = V_0 + V_a \sin(\omega t) \tag{1}$$

where $f = \omega/(2\pi) = 1/T$ is the frequency of the disturbance. The time when the sine wave reaches the level Vh is given by solving (1):

$$td = \frac{T}{2\pi} \sin^{-1}\left(\frac{Vh - V_0}{Va}\right) \tag{2}$$

The time when it recrosses is $(T/2) - td$, from symmetry. Similarly, the time when the sine crosses the level V1 is $$te = \frac{T}{2\pi} \sin^{-1}\left(\frac{Vl - V_0}{Va}\right) \tag{3}$$

and the recrossing time is $(3T/2) - te$.

Now, the output, f(t), has levels V1, and V1±ΔV (see FIG. 3). Since it is periodic, it can be expressed in a Fourier series, $$f(t) = \frac{a_0}{2} + \sum_{n=1}^{\infty}\left(An \cos\frac{2\pi n t}{T} + Bn \sin\frac{2\pi n t}{T}\right) \tag{4}$$

As discussed above, we are only interested in the components at the frequency of the injected signal. Thus, we approximate $$f(t) \approx A1 \cos\frac{2\pi t}{T} + B1 \sin\frac{2\pi t}{T} \tag{5}$$

To find the Fourier coefficient, we have the following:

$$A1 = \frac{2}{T}\int_0^T f(t) \cos\frac{2\pi t}{T} dt = \frac{2}{T}\Bigg[\int_0^{td} V1 \cos\frac{2\pi t}{T} dt + \tag{6}$$

$$\int_{td}^{\frac{T}{2}-td}(V1+\Delta V)\cos\frac{2\pi t}{T} dt +$$

$$\int_{\frac{T}{2}-td}^{te} V1 \cos\frac{2\pi t}{T} dt +$$

$$\int_{te}^{\frac{3T}{2}-te}(V1-\Delta V)\cos\frac{2\pi t}{T} dt +$$

$$\int_{\frac{3T}{2}-te}^{T} V1 \cos\frac{2\pi t}{T} dt\Bigg]$$

The cosines all evaluate to sines, and substituting we find $$A1 = \frac{1}{\pi}\Bigg[V1 \sin\frac{2\pi td}{T} + (V1+\Delta V)\sin\left(\pi - \frac{2\pi td}{T}\right) - \tag{7}$$

$$(V1+\Delta V)\sin\frac{2\pi td}{T} + V1 \sin\frac{2\pi te}{T} - V1\sin\left(\pi - \frac{2\pi td}{T}\right) +$$

$$(V1-\Delta V)\sin\left(3\pi - \frac{2\pi te}{T}\right) - (V1-\Delta V)\sin\frac{2\pi te}{T} -$$

$$V1 \sin\left(3\pi - \frac{2\pi te}{T}\right)\Bigg]$$

Making the obvious cancellations, and using the fact that $\sin(3\pi-\alpha)=\sin(\pi-\alpha)=\sin(\alpha)$, we find that A1=0, which is to say, since A multiplies the cosine term in the Fourier expansion, there is no phase shift.

Looking at the origin of the various terms in (6) and at how they cancel in (7), it is obvious that the symmetry of the output piecewise constant waveform is the same as that of the input sinusoid. Thus, regardless of the number of levels crossed, the A1 term will remain zero.

Evaluating the B1 term, $$B1 = \frac{2}{T}\int_0^T f(t)\sin\frac{2\pi t}{T} dt = \frac{2}{T}\Bigg[\int_0^{td} V1 \sin\frac{2\pi t}{T} dt + \tag{8}$$

$$\int_{td}^{\frac{T}{2}-td}(V1+\Delta V)\sin\frac{2\pi t}{T} dt +$$

$$\int_{\frac{T}{2}-td}^{te} V1 \sin\frac{2\pi t}{T} dt +$$

$$\int_{te}^{\frac{3T}{2}-te}(V1-\Delta V)\sin\frac{2\pi t}{T} dt +$$

$$\int_{\frac{3T}{2}-te}^{T} V1 \sin\frac{2\pi t}{T} dt\Bigg]$$

Again, the sines become -cosines, yielding $$B1 = \frac{1}{\pi}\Bigg[V1 \cos\frac{2\pi td}{T} + (V1+\Delta V)\cos\left(\pi - \frac{2\pi td}{T}\right) - \tag{9}$$

$$(V1+\Delta V)\cos\frac{2\pi td}{T} + V1 \cos\frac{2\pi te}{T} - V1\cos\left(\pi - \frac{2\pi td}{T}\right) +$$

$$(V1-\Delta V)\cos\left(3\pi - \frac{2\pi te}{T}\right) - (V1-\Delta V)\cos\frac{2\pi te}{T} -$$

$$V1 \cos\left(3\pi - \frac{2\pi te}{T}\right)\Bigg]$$

There are again cancellations, and this time $\cos(3\pi-\alpha)=\cos(\pi-\alpha)=-\cos(\alpha)$:

$$B1 = -\frac{1}{\pi}\Bigg[-2\Delta V\cos\frac{2\pi td}{T} + 2\Delta V\cos\frac{2\pi te}{T}\Bigg] \tag{10}$$

We can now substitute in the expressions for td and te, (2) and (3), $$B1 = \frac{2\Delta V}{\pi}\Bigg[\cos\left(\sin^{-1}\frac{Vh-V0}{Va}\right) - \tag{11}$$

$$\cos\left(\sin^{-1}\frac{Vl-V0}{Va}\right)\Bigg]$$

$$= \frac{2\Delta V}{\pi}\Bigg\{\left[1 - \left(\frac{Vh-V0}{Va}\right)\right]^{1/2} -$$

$$\left[1 - \left(\frac{Vl-V0}{Va}\right)\right]^{1/2}\Bigg\}$$

This is the term multiplying the sine term; since the input was of amplitude Va, the gain of the system is $$G = \frac{2\Delta V}{\pi Va}\Bigg\{\left[1 - \left(\frac{Vh-V0}{Va}\right)\right]^{1/2} - \left[1 - \left(\frac{Vl-V0}{Va}\right)\right]^{1/2}\Bigg\} \tag{12}$$

Examination of the two terms in G reveals that the positive term comes from the crossing of the upper transition level, and the negative term from the lower transition level. Evidently, there will always be a positive term for each transition that occurs above the average of the input sinusoid (VO) and a negative term for each transition below; and the difference between the number of positives and negatives must be either zero or one. That is, if the sinusoidal disturbance crosses three levels, for example, there must either be two positive terms and one negative term in G, or else one positive term and two negative terms.

This being the case, the maximum gain will occur if: 1) VO =Vh, which is to say that one of the transition levels occurs at the average value of the sinusoid; and 2) (V1−VO)/Va=1, which is to say that another transition occurs at exactly the peak of the sinusoid. With these two conditions, the expression in the curly braces=1, and $$Gmax = \frac{2 \Delta V}{\pi Va} \quad (13)$$

Now in the continuous (analog) case, and assuming a sine wave duty cycle, a sine wave output voltage is obtained. If the duty cycle varies from 0 to 1, the output varies from 0 to Vin; thus the gain is Vin. Since the step, $\Delta V$, is Vin times the change in duty cycle, Gmax differs from the continuous case by only the numerical factor $$\frac{Gmax,\text{digital}}{Gmax,\text{analog}} = \frac{2}{\pi} \quad (14)$$

which is less than 1.

What is claimed is:

1. A method for stabilizing a power converter against oscillations due to a mismatch between an output voltage setpoint and available ones of a plurality of quantized duty cycles, comprising the steps:

generating a reference voltage for indicating a desired output voltage setpoint:

comparing the reference voltage to an actual output voltage of the power converter to derive an error signal;

varying the pulsewidth of a first pulsewidth modulated control signal in accordance with the error voltage, the first pulsewidth modulated control signal having a first frequency;

converting the first pulsewidth modulated control signal to at least one second pulsewidth modulated control signal for varying a conduction time of a converter switching means so as to make the actual output voltage conform to the desired output voltage, the step of converting including a step of quantizing the pulsewidth to one of a plurality of quantized duty cycles; and injecting a dither signal such that the dither signal appears in the error signal, the dither signal having a second frequency that is less than the first frequency and greater than a bandwidth frequency of the power converter, the dither signal functioning to effectively increase the number of possible duty cycles by a factor given by the ratio of the second frequency to the bandwidth frequency.

2. A method as set forth in claim 1 wherein the second frequency is one quarter of the first frequency and at least an order of magnitude greater than the bandwidth frequency.

3. A method as set forth in claim 1 wherein the step of converting further comprises a step of generating a switching control signal for a synchronous rectifier.

4. A method as set forth in claim 1 wherein the step of converting further comprises a step of generating a plurality of the second pulsewidth modulated control signals for varying a conduction time of a corresponding plurality of converter switching means individual ones of which are associated with a corresponding plurality of power stage slices, individual ones of the plurality of second pulsewidth modulated control signals being offset in phase from one another and each having a pulsewidth equal to one of the plurality of quantized duty cycles.

5. A power converter, comprising:

means for generating a reference voltage for indicating a desired output voltage setpoint;

means for comparing the reference voltage to an actual output voltage of the power converter to derive an error signal;

means for varying the pulsewidth of a first pulsewidth modulated control signal in accordance with the error voltage, the first pulsewidth modulated control signal having a first frequency;

means for converting the first pulsewidth modulated control signal to at least one second pulsewidth modulated control signal for varying a conduction time of a converter switching means so as to make the actual output voltage conform to the desired output voltage, said converting means comprising means for quantizing the pulsewidth to one of a plurality of quantized duty cycles; and means for stabilizing said power converter against oscillations due to a mismatch between the output voltage setpoint and available ones of the plurality of quantized duty cycles;

wherein said converting means further comprises means for generating a plurality of the second pulsewidth modulated control signals for varying a conduction time of a corresponding plurality of converter switching means individual ones of which are associated with a corresponding plurality of power stage slices, individual ones of the plurality of second pulsewidth modulated control signals being offset in phase from one another and each having a pulsewidth equal to one of the plurality of quantized duty cycles.

6. A power converter, comprising:

means for generating a reference voltage for indicating a desired output voltage setpoint;

means for comparing the reference voltage to an actual output voltage of the power converter to derive an error signal;

means for varying the pulsewidth of a first pulsewidth modulated control signal in accordance with the error voltage, the first pulsewidth modulated control signal having a first frequency;

means for converting the first pulsewidth modulated control signal to at least one second pulsewidth modulated control signal for varying a conduction time of a converter switching means so as to make the actual output voltage conform to the desired output voltage, said converting means comprising means for quantizing the pulsewidth to one of a plurality of quantized duty cycles; and means for stabilizing said power converter against oscillations due to a mismatch between the output voltage setpoint and available ones of the plurality of quantized duty cycles;

wherein said stabilizing means comprises means for generating a dither signal that appears in the error signal, the dither signal having a second frequency that is less than the first frequency and greater than a bandwidth frequency of the power converter, the dither signal functioning to effectively increase the number of possible duty cycles by a factor given by the ratio of the second frequency to the bandwidth frequency.

7. A power converter as set forth in claim 6 wherein the second frequency is one quarter of the first frequency and at least an order of magnitude greater than the bandwidth frequency.

8. A power converter, comprising:

means for generating a reference voltage for indicating a desired output voltage setpoint;

means for comparing the reference voltage to an actual output voltage of the power converter to derive an error signal;

means for varying the pulsewidth of a first pulsewidth modulated control signal in accordance with the error voltage, the first pulsewidth modulated control signal having a first frequency;

means for converting the first pulsewidth modulated control signal to at least one second pulsewidth modulated control signal for varying a conduction time of a converter switching means so as to make the actual output voltage conform to the desired output voltage, said converting means comprising means for quantizing the pulsewidth to one of a plurality of discrete quantized duty cycles; and means for stabilizing said power converter against oscillations due to a mismatch between the output voltage setpoint and available ones of the plurality of quantized duty cycles.

9. A power converter as set forth in claim 8 wherein said converting means further comprises means for generating a switching control signal for a synchronous rectifier.

10. A power converter, comprising:

means for generating a reference voltage for indicating a desired output voltage setpoint;

means for comparing the reference voltage to an actual output voltage of the power converter to derive an error signal;

means for varying the pulsewidth of a first pulsewidth modulated control signal in accordance with the error voltage, the first pulsewidth modulated control signal having a first frequency;

means for converting the first pulsewidth modulated control signal to at least one second pulsewidth modulated control signal for varying a conduction time of a converter switching means so as to make the actual output voltage conform to the desired output voltage, said converting means comprising means for quantizing the pulsewidth to one of a plurality of quantized duty cycles; and means for stabilizing said power converter against oscillations due to a mismatch between the output voltage setpoint and available ones of the plurality of quantized duty cycles;

wherein said power converter is responsive to an input signal for setting a magnitude of the reference voltage, and wherein an output of said power converter is coupled to an RF power amplifier within a satellite communications payload for providing operating power to said RF power amplifier, said RF power amplifier outputting a downlink communications signal to a downlink transmitter antenna.

* * * * *